(12) United States Patent
Miyoshi et al.

(10) Patent No.: US 10,705,032 B2
(45) Date of Patent: Jul. 7, 2020

(54) X-RAY INSPECTION DEVICE

(71) Applicants: SHARP KABUSHIKI KAISHA, Sakai, Osaka (JP); NATIONAL INSTITUTE OF ADVANCED INDUSTRIAL SCIENCE AND TECHNOLOGY, Tokyo (JP)

(72) Inventors: Hiroaki Miyoshi, Sakai (JP); Takeshi Fujiwara, Tsukuba (JP); Hidetoshi Kato, Tsukuba (JP); Ryoichi Suzuki, Tsukuba (JP)

(73) Assignees: SHARP KABUSHIKI KAISHA, Sakai, Osaka (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 0 days.

(21) Appl. No.: 16/183,635

(22) Filed: Nov. 7, 2018

(65) Prior Publication Data
US 2019/0145914 A1 May 16, 2019

(30) Foreign Application Priority Data
Nov. 10, 2017 (JP) ................................. 2017-217530

(51) Int. Cl.
*G01N 23/203* (2006.01)
*G01N 23/20* (2018.01)
*G01N 23/04* (2018.01)

(52) U.S. Cl.
CPC .......... *G01N 23/203* (2013.01); *G01N 23/04* (2013.01); *G01N 23/20083* (2013.01); *G01N 2223/045* (2013.01); *G01N 2223/053* (2013.01)

(58) Field of Classification Search
CPC .......... G01N 23/20083; G01N 23/203; G01N 23/04; G01N 2223/045; G01N 2223/053
See application file for complete search history.

(56) References Cited

U.S. PATENT DOCUMENTS

| | | | | |
|---|---|---|---|---|
| 6,292,532 | B1 * | 9/2001 | Kawahara | G01N 23/223 378/45 |
| 2001/0010462 | A1 | 8/2001 | Kawanishi et al. | |
| 2003/0169847 | A1 * | 9/2003 | Karellas | A61B 6/481 378/98.3 |
| 2011/0186741 | A1 * | 8/2011 | Ohta | G01T 1/24 250/370.08 |
| 2013/0315369 | A1 * | 11/2013 | Turner | G01N 23/203 378/41 |

FOREIGN PATENT DOCUMENTS

| | | | | |
|---|---|---|---|---|
| EP | 3239699 A1 * | 11/2017 | | G01V 5/0025 |
| JP | 2001-208795 A | 8/2001 | | |
| JP | 2005091053 A * | 4/2005 | | |
| JP | 2007232530 A * | 9/2007 | | |
| JP | 2008-002940 A | 1/2008 | | |

* cited by examiner

*Primary Examiner* — Chih-Cheng Kao
(74) *Attorney, Agent, or Firm* — ScienBiziP, P.C.

(57) ABSTRACT

An x-ray inspection device includes an x-ray irradiation unit that irradiates an object for inspection with an x-ray; a sensor that detects an electric signal corresponding to a back-scattered x-ray reflected off the object for inspection; a measurement unit that measures the object for inspection with reference to the electric signal output by the sensor; and a heavy metal plate having a pinhole that allows the back-scattered x-ray to pass therethrough, the pinhole forming an image of the back-scattered x-ray on the sensor.

6 Claims, 7 Drawing Sheets

X-RAY INSPECTION DEVICE

BACKGROUND

1. Field

The present disclosure relates to an x-ray inspection device.

2. Description of the Related Art

A technology acquiring a fluoroscopic image of an object for inspection by radiating x-rays to the object or detecting a back-scattered x-rays from the object for inspection is known so far. A conventional x-ray source, however, produces x-rays with poor directivity, and the back-scattered x-ray is too weak to acquire a fluoroscopic image of the object for inspection.

To address this, Japanese Unexamined Patent Application Publication No. 2008-2940 (disclosed on Jan. 10, 2008) discloses a technology of using an x-ray source that periodically produces highly directive pulse x-rays with a sufficiently small angle of divergence.

Japanese Unexamined Patent Application Publication No. 2001-208795 (disclosed on Aug. 3, 2001) discloses a technology of causing an x-ray produced in an x-ray tube to pass through a pinhole to form a beam, radiating the x-ray beam to an object for inspection, and launching the back-scattered x-ray into an internal circumferential surface of an x-ray inspection device through a circular slit.

The above-described technology includes radiating an x-ray in the form of a spot beam to an object for inspection and capturing the weak back-scattered x-ray. This technology thus requires special devices, such as a device that detects only a back-scattered x-ray at radiation timing, a collimation system disposed adjacent to the x-ray tube to form a spot beam, a system that scans an object with the spot beam, and a device for installing a large number of inspection devices around a spot-beam x-ray irradiation unit. Particularly, an increase of the energy of an x-ray tube involves a size increase of the collimation system disposed adjacent to the x-ray tube.

It is desirable to detect x-rays and form a back-scattered x-ray image without using a special structure for capturing a weak x-ray.

SUMMARY

According to an aspect of the disclosure, there is provided an x-ray inspection device including an x-ray irradiation unit that irradiates an object for inspection with an x-ray; an x-ray detector that detects an electric signal corresponding to a back-scattered x-ray reflected off the object for inspection; a measurement unit that measures the object for inspection with reference to the electric signal output by the x-ray detector; and an open member having an opening that allows the back-scattered x-ray to pass therethrough, the opening forming as image of the back-scattered x-ray on the x-ray detector.

DESCRIPTION OF THE EMBODIMENTS

Embodiment 1

Figure 1:
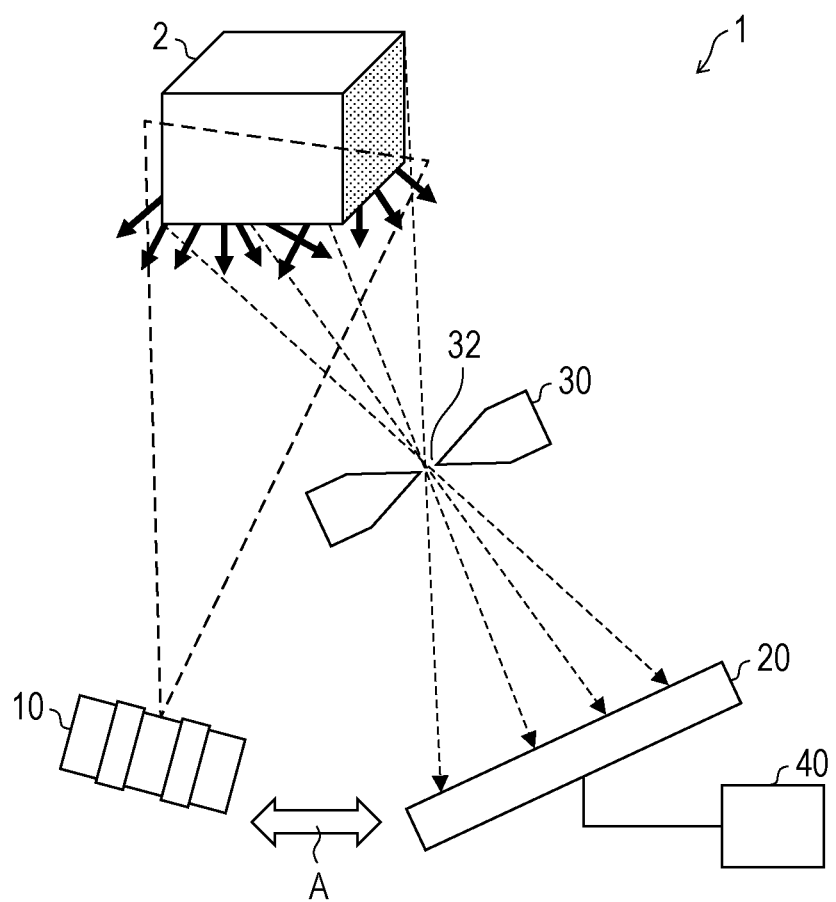
FIG. 1 is a schematic diagram of an x-ray inspection device according to embodiment 1 of the present disclosure.

Embodiments of the present disclosure are described below in detail. FIG. 1 is a schematic diagram of an x-ray inspection device 1 according to the present embodiment.

X-Ray Inspection Device

The x-ray inspection device 1 according to the present embodiment includes an x-ray irradiation unit 10, a sensor 20, a heavy metal plate 30, and a measurement unit 40.

The x-ray irradiation unit 10 irradiates an object 2 for inspection with an x-ray. The x-ray irradiation unit 10 according to the present embodiment is smaller and lighter than an existing meter-sized product. For example, a product having a CD-case size, a thickness of 70 mm, and a weight of several kilograms is employable as the x-ray irradiation unit 10 according to the present embodiment. The x-ray inspection device 1 according to the present embodiment including the small and light x-ray irradiation unit 10 has higher flexibility in arrangement of components than an existing product.

The x-ray irradiation unit 10 radiates x-rays without, for example, concentrating the x-rays. Thus, the x-ray irradiation unit 10 radiates x-rays to a radiation area at a uniform range from the object 2 for inspection. The radiation area is determined by the amount of energy of the x-rays radiated by the x-ray irradiation unit 10 and the distance between the x-ray irradiation unit 10 and the object 2 for inspection.

A large part of an x-ray radiated from the x-ray irradiation unit 10 is transmitted through or absorbed by the object 2 for inspection, but a part of the x-ray is reflected off the object 2 for inspection. The reflected x-ray is referred to as a back-scattered x-ray.

The sensor 20 is an x-ray detector that detects an electric signal corresponding to the back-scattered x-ray reflected off the object 2 for inspection.

The heavy metal plate 30 is an open member having a pinhole 32, which is an opening that allows the back-scattered x-ray to pass therethrough. The pinhole 32 forms an image of the back-scattered x-ray on the sensor 20. The sensor 20 detects the back-scattered x-ray that has passed through the pinhole 32. Examples of heavy metal contained in the heavy metal plate 30 include lead and tungsten.

The measurement unit 40 measures the object 2 for inspection with reference to a captured image of the object 2 for inspection corresponding to the electric signal output by the sensor 20.

Figure 2:
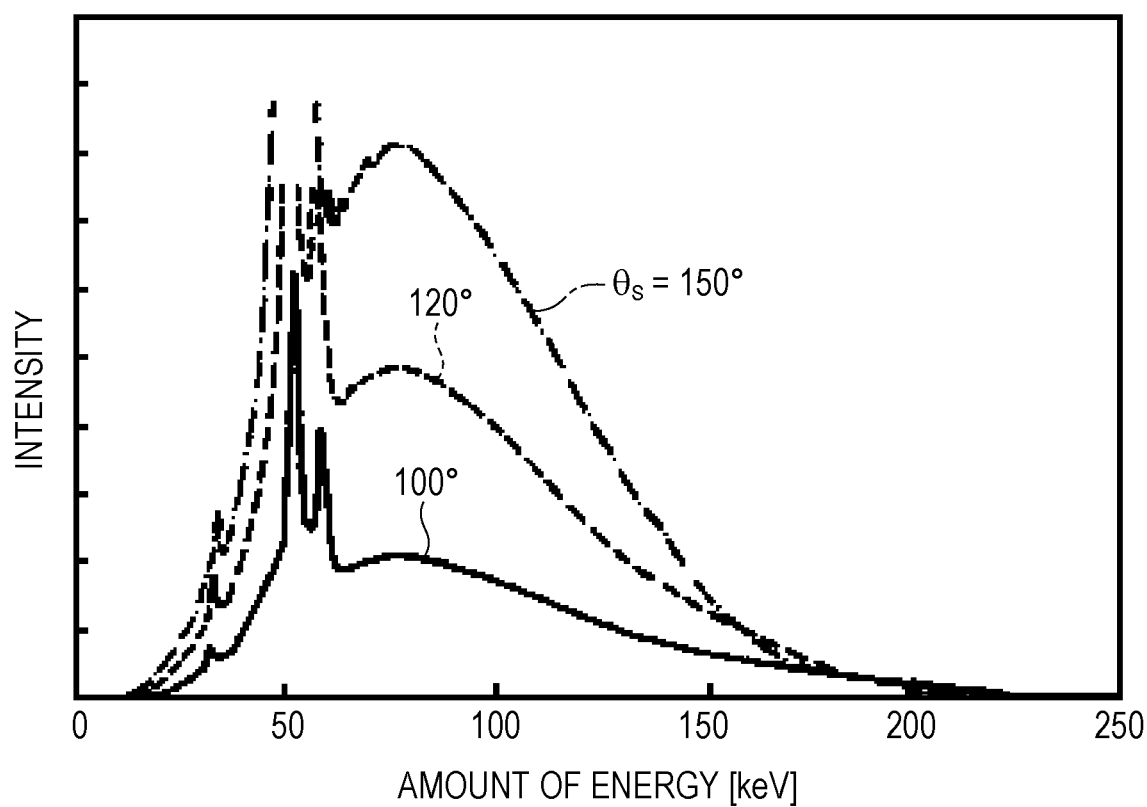
FIG. 2 illustrates the relationship between the energy of each scattering angle and the intensity of a back-scattered x-ray.

FIG. 2 illustrates the relationship between the voltage (horizontal axis) applied to the x-ray irradiation unit 10 under various scattering angles θs and the intensity (vertical axis) of the back-scattered x-ray. The scattering angles θs here refer to angles by which the travel directions are changed from when the x-rays are radiated. FIG. 2 illustrates the x-rays for three different scattering angles θs of 150°, 120°, and 100°.

As illustrated in FIG. 2, as the x-rays have the scattering angles θs of closer to 180°, the corresponding back-scattered x-rays have higher intensity. Thus, in the present embodiment, as indicated with arrow A in FIG. 1, it is important to dispose the x-ray irradiation unit 10 and the sensor 20 as close to each other as possible. Specifically, it is important for the x-ray irradiation unit 10 according to the present embodiment to have a small size.

Sensor

Figure 3:
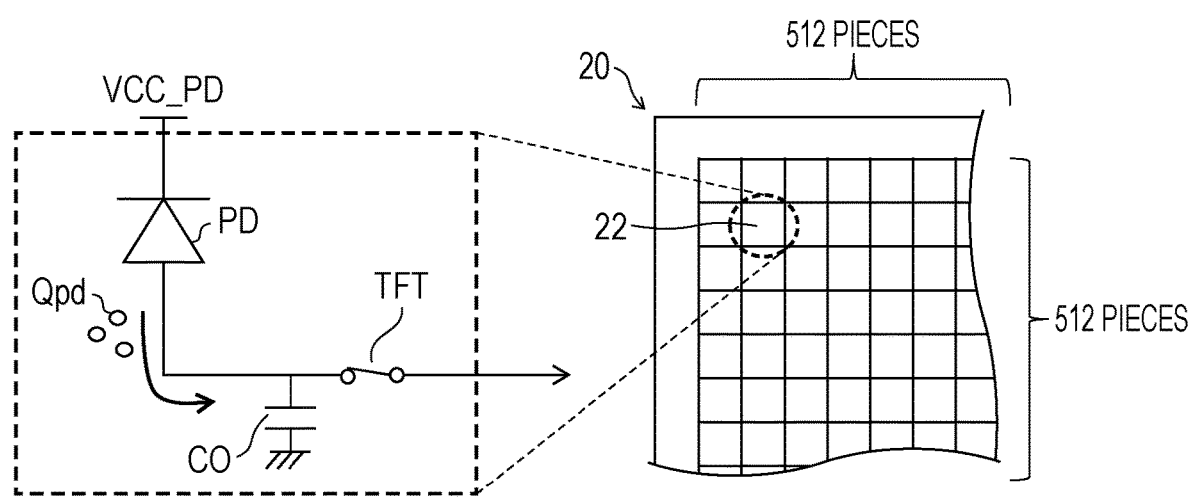
FIG. 3 is a schematic diagram of an x-ray detector according to embodiment 1 of the present disclosure.

FIG. 3 is a top view of the sensor 20. The sensor 20 is a flat panel display, includes an element array, which is an array of multiple elements 22 deposited in the form of a glass, and a scintillator, which covers the entire surface of the element array. The scintillator is an x-ray-to-light converter having a function of receiving a back-scattered x-ray and converting the back-scattered x-ray into light.

The multiple elements 22 each have a size of, for example, 200 μm×200 μm. For example, the element array includes 512 elements arranged in each row and 512 elements arranged in each column, that is, 262144 elements arranged in total. Here, the sensitive area is 102.4 mm×102.4 mm.

Each of the multiple elements 22 includes a photodiode PD, which is a photoelectric converter, a capacitor CO, which is a holder, and a thin film transistor TFT, which is part of a transfer unit.

The photodiode PD receives light converted by the scintillator and produces an electric charge Qpd. The photodiode PD is connected to a voltage application terminal VCC_PD.

The capacitor CO includes an oxide semiconductor, and stores the electric charge Qpd produced by the photodiode PD.

The thin film transistor TFT includes an oxide semiconductor, and functions as a switch that turns on or off the connection between the capacitor CO and the measurement unit 40. The thin film transistor TFT transfers the electric signal held by the capacitor CO to the measurement unit 40.

The sensor 20 includes a system that holds and transfers electric signals, and the system includes an oxide semiconductor. The oxide semiconductor has a significantly smaller leakage current than amorphous silicon. Specifically, the leakage current of the structure including the oxide semiconductor is smaller than or equal to 1/100 of the leakage current of the structure including amorphous silicon. Thus, the sensor 20 can store weak electric charges produced by weak back-scattered x-rays for a long period. Specifically, the x-ray inspection device 1 can detect and amplify weak back-scattered x-rays for a long period, and can express the intensity of the back-scattered x-rays in the form of images.

The center of the detection surface of the sensor 20 is located at a position within an angle range of 150° to 180° with respect to the center line of the x-ray radiated from the x-ray irradiation unit 10.

The x-ray inspection device 1 according to the present embodiment enables checking of the structure on the side facing the x-ray irradiation unit 10, which cannot be checked through a fluoroscopic image obtained from the x-ray that has transmitted through the object 2 for inspection.

Embodiment 2

Another embodiment of the present disclosure is described below. For illustration convenience, components having the same functions as the components described in the above embodiment are denoted with the same reference signs and not described repeatedly.

Figure 4:
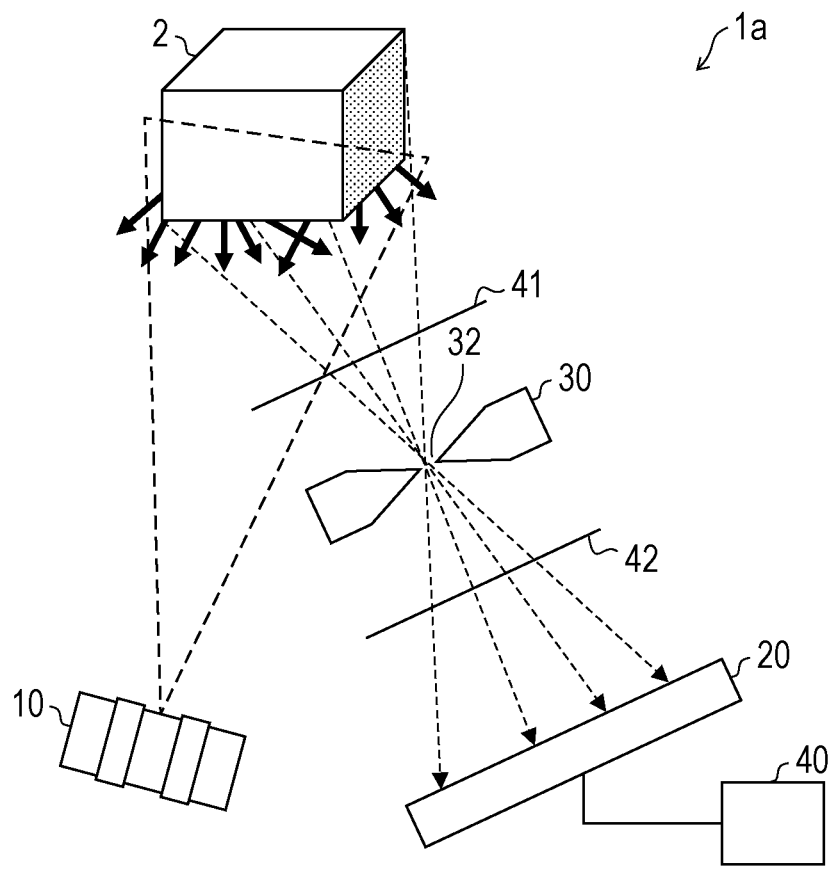
FIG. 4 is a schematic diagram of an x-ray inspection device according to embodiment 2 of the present disclosure.

As shown in FIG. 4, in the present embodiment, an x-ray inspection device 1a also includes a first filter 41 and a second filter 42.

The x-ray inspection device 1a includes a first filter 41, disposed upstream of the heavy metal plate 30 in the travel direction of the back-scattered x-ray, and a second filter 42, disposed downstream of the heavy metal plate 30 in the travel direction.

The first filter 41 and the second filter 42 are made of metal, such as copper or aluminum. The first filter 41 and the second filter 42 allow only x-rays having a specific amount of energy to transmit therethrough to block unnecessary x-rays. The first filter 41 and the second filter 42 adjust the amount of energy transmitted therethrough with adjustment of the material from which they are made and the thickness in the travel direction of the back-scattered x-ray.

In the present embodiment, the first filter 41 allows only x-rays having a large amount of energy and blocks x-rays having a small amount of energy. Thus, the back-scattered x-rays that pass through the pinhole are x-rays having a large amount of energy. The second filter 42 blocks x-rays of a specific amount of energy produced after passing through the pinhole 32. The x-ray has its amount of energy changed in response to colliding against the edge of the pinhole 32 to change the scattering angle. Thus, particularly, to form an image of only the back-scattered x-ray of a specific amount of energy on the sensor 20, it is desirable to block the x-rays having their amount of energy changed by colliding against the edge of the pinhole 32.

The first filter 41 enables selective acquirement of information obtained from a back-scattered x-ray having a large amount of energy. X-rays having a larger amount of energy are transmitted to and scattered at a deeper portion inside the surface of the object 2 for inspection. Specifically, a back-scattered x-ray having a large amount of energy is an x-ray scattered inside the object 2 for inspection. Thus, the x-ray inspection device 1 according to the present embodiment can selectively acquire an image of an inside of the object 2 for inspection.

In addition, the second filter 42 enables removal of unnecessary information caused by the x-ray passing through the pinhole 32 from the captured image.

In the present embodiment, the filters are disposed upstream and downstream of the heavy metal plate 30 in the travel direction of the back-scattered x-ray. Nevertheless, at least one filter may be disposed on at least one of upstream and downstream sides of the heavy metal plate 30 in the travel direction of the back-scattered x-ray.

Embodiment 3

Another embodiment of the present disclosure is described below. For illustration convenience, components having the same functions as the components described in the above embodiment are denoted with the same reference signs and not described repeatedly.

Figure 5:
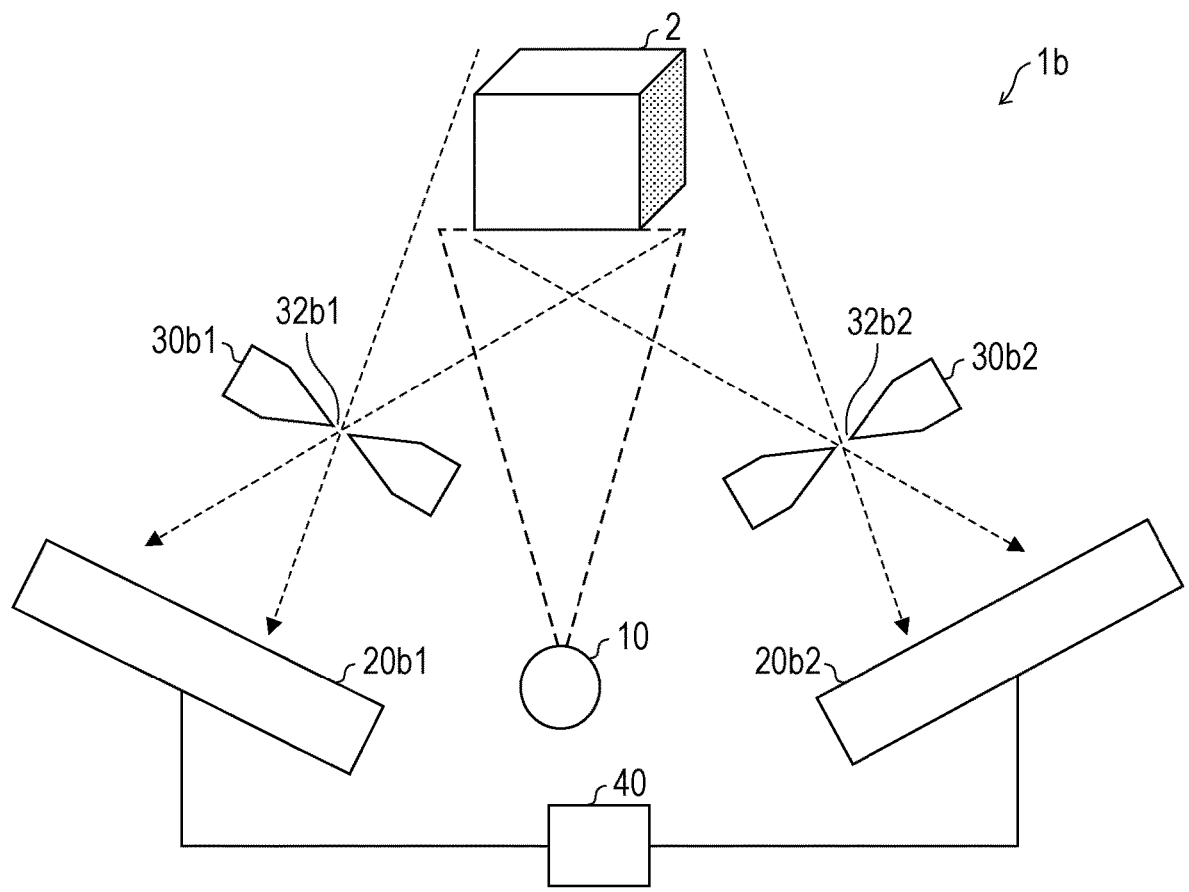
FIG. 5 is a schematic diagram of an x-ray inspection device according to embodiment 3 of the present disclosure.

As illustrated in FIG. 5, an x-ray inspection device 1b according to the present embodiment includes a first sensor 20b1, a second sensor 20b2, and a three-dimensional image generating unit, not illustrated. Specifically, the x-ray inspection device 1b according to the present embodiment includes multiple sensors, and can produce a three-dimensional image from multiple images captured from different directions. The x-ray inspection device 1b includes a first heavy metal plate 30b1 corresponding to a first sensor 20b1 and a second heavy metal plate 30b2 corresponding to a second sensor 20b2.

The three-dimensional image generating unit produces a three-dimensional image in accordance with the measurement results from the first sensor 20b1 and the second sensor 20b2.

In order for multi 1e sensors to detect back-scattered x-rays, it is essential that (1) the x-ray irradiation unit 10 widely radiates x-rays; (2) the sensors are disposed adjacent to the x-ray irradiation unit 10; and (3) the sensors can collect a small amount of back-scattered x-rays for a long period.

The x-ray inspection device 1b according to the present embodiment satisfies that (1) the x-ray irradiation unit 10 radiates x-rays without, for example, concentrating the x-rays; (2) the x-ray irradiation unit 10 has a small size; and (3) the system that holds and transfers electric signals includes an oxide semiconductor. Specifically, the x-ray inspection device 1b according to the present embodiment satisfies the above-described essential conditions.

Embodiment 4

Another embodiment of the present disclosure is described below. For illustration convenience, components having the same functions as the components described in the above embodiment are denoted with the same reference signs and not described repeatedly.

Figure 6:
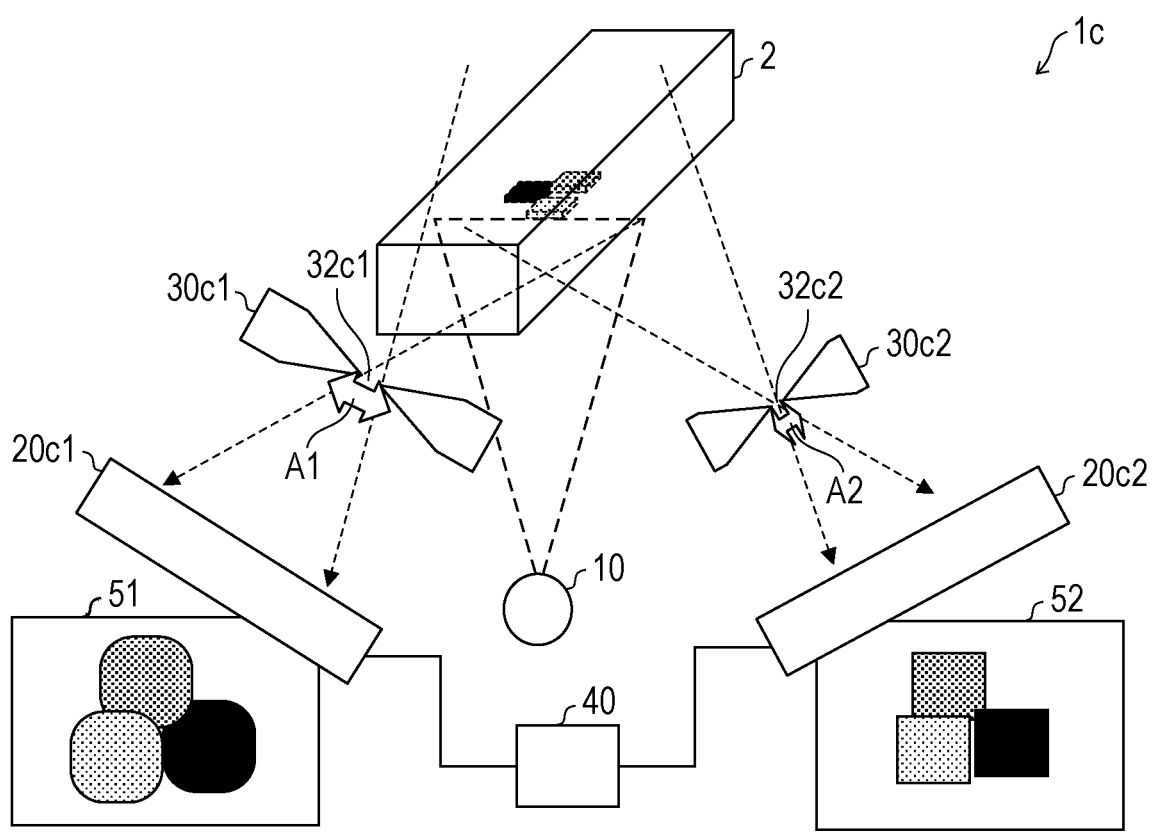
FIG. 6 is a schematic diagram of an x-ray inspection device according to embodiment 4 of the present disclosure.

As illustrated in FIG. 6, an x-ray inspection device 1c according to the present embodiment includes a first sensor 20c1 and a second sensor 20c2. The x-ray inspection device 1c also includes a first heavy metal plate 30c1 corresponding to the first sensor 20c1 and a second heavy metal plate 30c2 corresponding to the second sensor 20c2.

As illustrated in FIG. 6, a first pinhole 32c1 formed in the first heavy metal plate 30c1 and a second pinhole 32c2 formed in the second heavy metal plate 30c2 have different opening diameters. In the present embodiment, as indicated with arrow A1 and arrow A2, the diameter of the first pinhole 32c1 is larger than the diameter of the second pinhole 32c2. Similarly, the diameter of the second pinhole 32c2 is smaller than the diameter of the first pinhole 32c1.

The back-scattered x-ray that has passed through the first pinhole 32c1 having a relatively large diameter is detected by the first sensor 20c1. With the detection of the first sensor 20c1, the object 2 for inspection can be subjected to screening relatively quickly. Specifically, the first sensor 20c1 enables acquirement of a captured image 51 that is a relatively rough image of a wide range.

On the other hand, the back-scattered x-ray that has passed through the second pinhole 32c2 having a smaller diameter is detected by the second sensor 20c2. With the detection of the second sensor 20c2, the object 2 for inspection can be measured further in detail. Specifically, the second sensor 20c2 enables acquirement of a relatively precise captured image 52.

To measure a wide area, for example, for detection of the infrastructure, the x-ray inspection device 1c according to the present embodiment firstly relatively quickly screens the entirety of the object for inspection with the first sensor 20c1 and acquires a relatively rough captured image. Thereafter, the x-ray inspection device 1c can measure a possibly defective portion with the second sensor 20c2 further in detail.

Embodiment 5

Another embodiment of the present disclosure is described below. For illustration convenience, components having the same functions as the components described in the above embodiment are denoted with the same reference signs and not described repeatedly.

Figure 7:
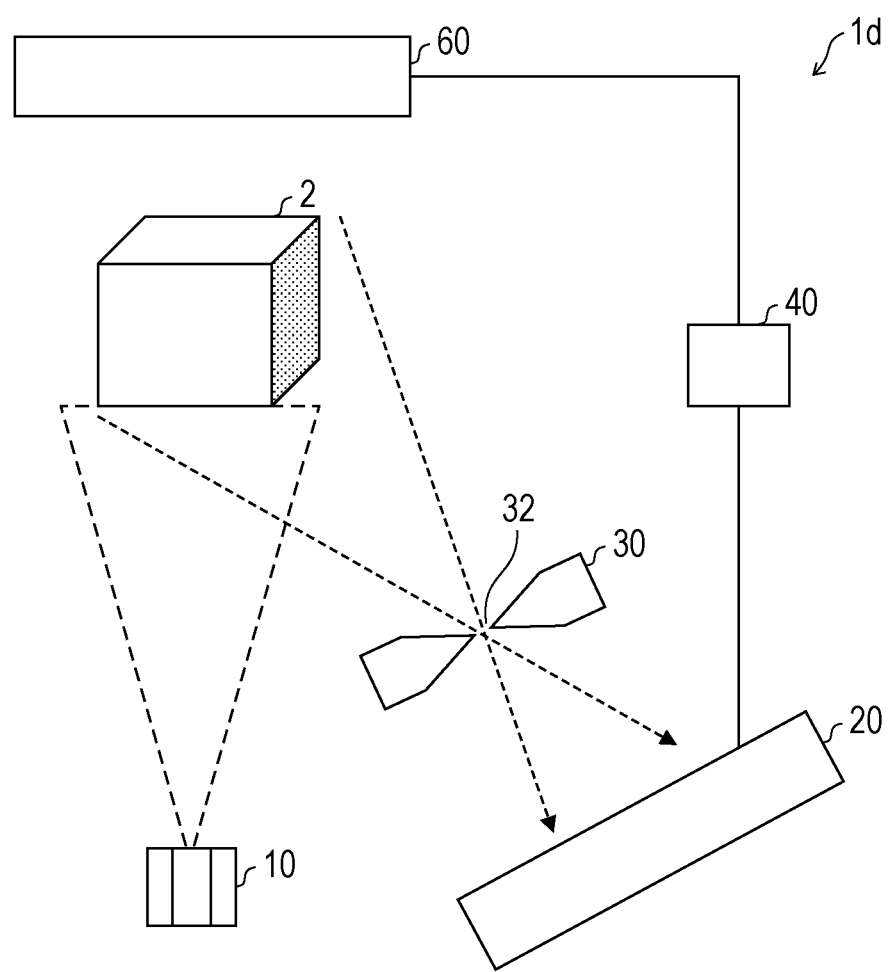
FIG. 7 is a schematic diagram of an x-ray inspection device according to embodiment 5 of the present disclosure.

As illustrated in FIG. 7, an x-ray inspection device 1d according to the present embodiment includes a transmitted x-ray sensor (transmitted x-ray detector) 60. The transmitted x-ray sensor 60 is disposed on the opposite side of the object 2 for inspection from the x-ray irradiation unit 10, and detects a transmitted x-ray that has transmitted through the object 2 for inspection.

The x-ray inspection device 1d according to the present embodiment can acquire both a captured image corresponding to the back-scattered x-ray reflected off the object 2 for inspection and a captured image corresponding to the x-ray that has transmitted through the object 2 for inspection.

In addition, the x-ray inspection device 1d according to the present embodiment can acquire a 360-degree image including the internal structure of the object 2 for inspection by irradiating the object 2 for inspection with x-rays having various different amounts of energy while adjusting the amount of energy of the x-rays radiated from the x-ray irradiation unit 10.

The captured images corresponding to the x-rays that have transmitted through the object 2 for inspection can bring the results of the photoelectric effect. On the other hand, the captured images corresponding to the back-scattered x-rays that have been reflected off the object 2 for inspection can bring the results or the Compton effect. The photoelectric effect and the Compton effect are closely related to the composition of a substance constituting the object 2 for inspection. Thus, information on the composition of a substance constituting the object for inspection can be obtained from the captured images.

For example, in security inspection of baggage, whether a dangerous article is contained is highly accurately determined from both a captured image corresponding to a back-scattered x-ray reflected off a baggage, and a captured image corresponding to an x-ray that has transmitted through the baggage.

The x-ray inspection device 1, 1a, 1b, 1c, or 1d according to a first aspect of the present disclosure includes the x-ray irradiation unit 10, which irradiates the object 2 for inspection with an x-ray, the x-ray detector (sensor 20), which detects an electric signal corresponding to a back-scattered x-ray reflected off the object 2 for inspection, a measurement unit 40, which measures the object 2 for inspection with reference to the electric signal output by the x-ray detector (sensor 20), and an open member (heavy metal plate 30), which has an opening (pinhole 32) that allows the hack-scattered x-ray to pass therethrough and forms an image of the back-scattered x-ray on the x-ray detector (sensor 20).

The above-described structure can detect an x-ray, form a back-scattered x-ray image, and measure the object 2 for inspection without using a special structure for capturing a weak x-ray.

In the x-ray inspection device 1, 1a, 1b, 1c, or 1d of a second aspect of the present disclosure and according to the first aspect, the x-ray detector (sensor 20) may include a holding unit (capacitor CO), which includes an oxide semiconductor and holds electric signals corresponding to the back-scattered x-ray, and a transfer unit (thin film transistor TFT), which includes an oxide semiconductor and transfers the electric signals held by the holding unit (capacitor CO) to the measurement unit 40.

The above-described structure can detect x-rays without using a special structure for capturing weak x-rays.

In the x-ray inspection device 1, 1a, 1b, 1c, or 1d of a third aspect of the present disclosure and according to the first or second aspect, the center of the detection surface of the x-ray detector (sensor 20) may be located at a position within an angle range of 150° to 180° with respect to the center line of the x-ray radiated from the x-ray irradiation unit 10.

The above-described structure can detect x-rays having a relatively high intensity.

The x-ray inspection device 1a of a fourth aspect of the present disclosure and according to the first to third aspects may include an open member (heavy metal plate 30) having an opening (pinhole 32) that allows the back-scattered x-ray to pass therethrough, and at least one of the filters 41 and 42 that transmits/transmit an x-ray of a predetermined amount of energy and that is/are disposed upstream and/or downstream of the open member (heavy metal plate 30) in the travel direction of the back-scattered x-ray.

The above-described structure can detect only x-rays having a specific amount of energy.

The x-ray inspection device 1b of a fifth aspect of the present disclosure and according to the first to fourth aspects may include a plurality of the x-ray detectors (sensors 20b1 and 20b2), and a three-dimensional image generating unit, which produces a three-dimensional image in accordance with measurement results of the plurality of x-ray detectors (sensors 20b1 and 20b2).

The above-described structure can acquire a three-dimensional image.

The x-ray inspection device 1c of a sixth aspect of the present disclosure and according to the first to fourth aspects may include a plurality of the x-ray detectors (sensors 20c1 and 20c2), and a plurality of the open members (32d1 and 32d2) corresponding to the plurality of x-ray detectors (sensors 20c1 and 20c2) and respectively having openings (32c1 and 32c2) having different opening diameters.

The above-described structure can detect the same object 2 for inspection with different resolutions.

The x-ray inspection device 1d of a seventh aspect of the present disclosure and according to the first to sixth aspects may include a transmitted x-ray detector (transmitted x-ray sensor) 60, which detects a transmitted x-ray that has transmitted through the object 2 for inspection.

The above-described structure can more highly accurately measure an object.

The present disclosure is not limited to the above-described embodiments and may be changed in various manners within the scope of claims. Embodiments obtained by appropriately combining technical devices disclosed in different embodiments are also included in the technical scope of the present disclosure. New technical features can be formed by combining technical devices disclosed in the embodiments.

The present disclosure contains subject matter related to that disclosed in Japanese Priority Patent Application JP 2017-217530 filed in the Japan Patent Office on Nov. 10, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An x-ray inspection device, comprising:
an x-ray irradiation unit that irradiates an object for inspection with an x-ray;
an x-ray detector that detects an electric signal corresponding to a back-scattered x-ray reflected off the object for inspection;
a measurement unit that measures the object for inspection with reference to the electric signal detected by the x-ray detector;
an open member that has an opening that allows the back-scattered x-ray to pass therethrough, the opening forming an image of the back-scattered x-ray on the x-ray detector; and
filters that are disposed on upstream and downstream sides, respectively, of the open member in a travel direction of the back-scattered x-ray, each of the filters allowing an x-ray having a predetermined amount of energy to transmit therethrough.

2. The x-ray inspection device according to claim 1, wherein the x-ray detector includes
a holding unit, which includes an oxide semiconductor and holds an electric signal corresponding to the back-scattered x-ray, and
a transfer unit, which includes an oxide semiconductor and transfers the electric signal held by the holding unit to the measurement unit.

3. The x-ray inspection device according to claim 1, wherein a center of a detection surface of the x-ray detector is located at a position within an angle range of 150° to 180° with respect to a center line of the x-ray radiated from the x-ray irradiation unit.

4. The x-ray inspection device according to claim 1, wherein the x-ray detector is provided in a plurality, the x-ray inspection device further comprising:
a three-dimensional image generating unit, which produces a three-dimensional image in accordance with measurement results of the plurality of x-ray detectors.

5. The x-ray inspection device according to claim 1, wherein the x-ray detector is provided in a plurality, and
wherein the open member is provided in a plurality corresponding to the plurality of x-ray detectors, the plurality of open members respectively having openings having different opening diameters.

6. The x-ray inspection device according to claim 1, further comprising:
a transmitted x-ray detector, which detects a transmitted x-ray that has transmitted through the object for inspection.

* * * * *